Jan. 21, 1958
H. M. PASSMAN
2,820,933
NON-BINDING VARIABLE CAPACITOR
Filed April 26, 1954
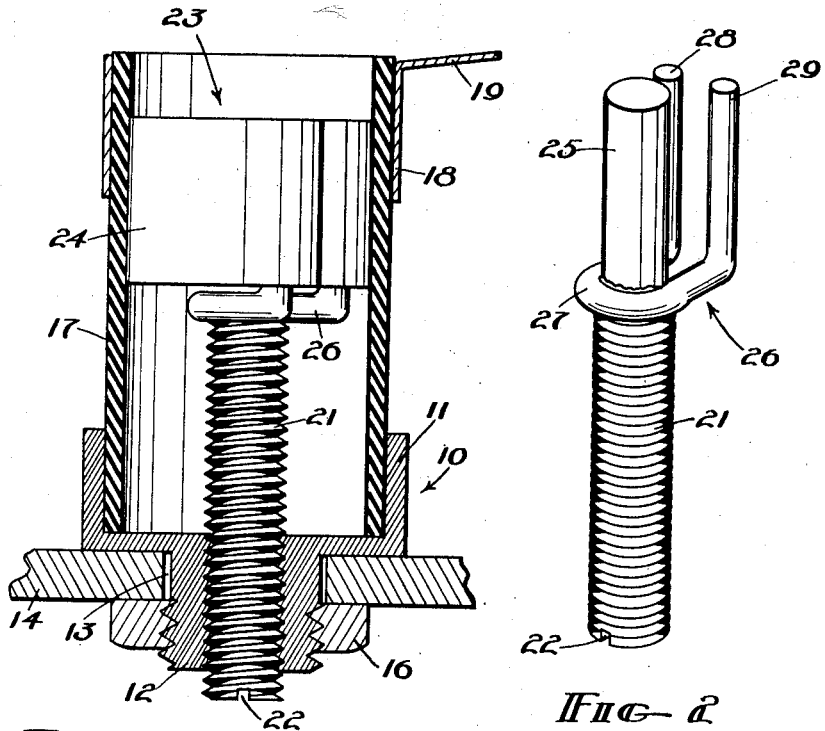
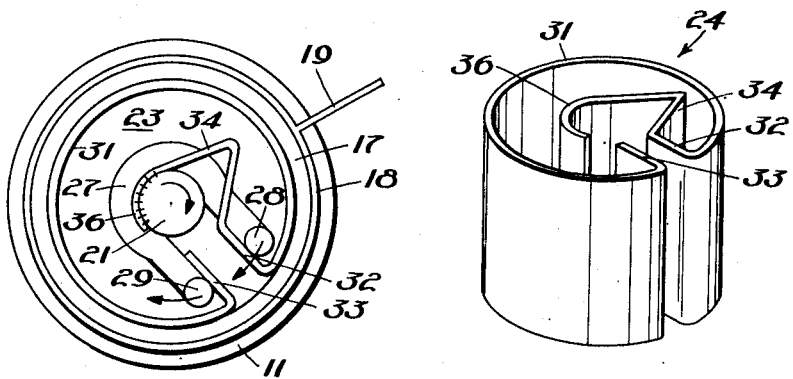
INVENTOR.
HARRY M. PASSMAN
BY
ATTORNEY

2,820,933
NON-BINDING VARIABLE CAPACITOR

Harry M. Passman, Cedar Rapids, Iowa, assignor to Collins Radio Company, Cedar Rapids, Iowa, a corporation of Iowa Application April 26, 1954, Serial No. 425,418

4 Claims. (Cl. 317—249)

This invention relates generally to variable capacitors and specifically to a capacitor which may be varied smoothly without binding.

Conventionally, trimmer capacitors have been provided with cylindrical inner and outer plates in coaxial arrangement wherein the inner plate is longitudinally moved relative to the outer plate by means of a threaded shaft. Capacitance is varied by the longitudinal movement of the inner cylindrical plate with respect to the outer cylindrical plate. However, exact control over the setting of such capacitors has been lacking due to a number of factors. Particularly, the inner plate is often loosely supported and fails to maintain a constant position with respect to the outer plate; hence, capacitance does not remain constant at a particular setting. At other times, the inner plate is spring biased by detent means to maintain a constant position with respect to the outer plate, and often a particular setting can be changed only by movement that begins with a jump to overcome detent friction before smooth movement may be obtained. Sometimes vibrating movement results. It is accordingly difficult, if not impossible, in those cases to vary capacitance in exact amounts.

It is therefore an object of this invention to provide a variable capacitor capable of very small and exact adjustments.

It is another object of this invention to provide a variable capacitor which does not bind when varied.

It is a further object of this invention to provide a variable capacitor which has an inner plate that may be moved smoothly without vibration.

It is a still further object of this invention to provide a variable capacitor which maintains at all times a constant spacing between inner and outer plates.

The invention provides a coaxially arranged variable capacitor wherein the rotor has a novel structure which provides detent action and yet obtains movement without the difficulties of binding, jumping or vibration.

Further objects, features and advantages of this invention will be apparent to a person skilled in the art upon further study of the specification and drawings, in which:

Figure 1 is a partial sectional view of the invention;

Figure 2 is a perspective view of a shaft and yoke used by the invention;

Figure 3 is an end view of the invention; and

Figure 4 is a perspective view of a rotor plate used by the invention.

Now referring to the invention in more detail, Figure 1 illustrates in sectional view a support 10 which has a large sleeve portion 11 formed at one end and a small cylindrical portion 12 formed at the other end. Small portion 12 is received through a hole 13 in a plate 14 which might be a radio chassis, and a nut 16 is threadedly received over portion 12 to firmly fasten support 10 to chassis 14.

One end of a hollow cylindrical form 17 of insulating material is received within sleeve portion 11 of support 10 and is attached thereto. A cylindrical plate 18 of conducting material is received over the opposite end of form 17, and a tab 19 extends from plate 18 as a means for providing electrical connection. Plate 18 may be formed from metal or may be painted on the outside of form 17 by means of suitable conducting paint.

A shaft 21 is threadedly received through support 10 and has a slot 22 formed at one end for engagement with the end of a screw driver or other suitable turning means. A rotor assembly 23 is fastened to the other end of shaft 21 and comprises a novel rotor plate 24 and yoke 26.

Yoke 26 may be formed of wire or other suitable material and has an arcuate portion 27 which partially surrounds the non-threaded end 25 of shaft 21 and is welded thereto or is fastened by other suitable means. A pair of yoke fingers 28 and 29 extend parallel to shaft 21 and are supported at one of their ends which connect to opposite sides of arcuate portion 27, respectively.

Rotor plate 24 (best shown in Figure 4) may be formed from a sheet of resilient conducting material which might be Phosphor bronze. It has a cylindrical portion 31 that is formed with a longitudinal opening. A pair of end portions 32 and 33 extend inwardly and are fastened to cylindrical portion 31 on opposite sides of its longitudinal opening. One side of an angular portion 34, which is formed with an intermediate bend, connects to the inner edge of end portion 32, and the other side of portion 34 connects to a curved terminal portion 36.

When assembled, curved portion 36 of rotor plate 24 is mounted on non-threaded end 25 of shaft 21 and is welded or is otherwise fastened thereto. Fingers 28 and 29 of yoke 26 are received through rotor plate 24 adjacent opposite sides of end portions 32 and 33, repectively. Fingers 28 and 29 do not contact cylindrical portion 31.

The resilient material from which rotor plate 24 is made causes it to be biased outwardly against the inside surface of cylindrical form 17. Since form 17 has constant thickness throughout, the spacing between the capacitor plates is always maintained constant.

The spring bias also provides detent action for rotor assembly 23 by increasing the static friction between cylindrical portion 31 and form 17. The detent action prevents vibration from affecting the setting of the capacitor.

This invention prevents the large static friction between form 17 and rotor 23 from causing binding when the rotor is moved. However, the invention automatically decreases the static friction when rotor 31 is rotated in either direction.

For example, shaft 21 might be rotated clockwise in Figure 3. Yoke 26 with fingers 28 and 29 rotate substantially rigidly with shaft 21. At the instant clockwise rotation begins, finger 28 tends to push end portion 32 in a clockwise direction and the other finger 29 tends to move away from the other end portion 33.

As end portion 32 begins to move in a clockwise direction, there is a transient readjustment of the biasing force on cylindrical portion 31. The opposite end of cylindrical portion 31, adjacent to end portion 33, remains momentarily stationary because of static friction, and end portion 32 is pushed clockwise to narrow the gap between end portions 32 and 33. Accordingly, the part of cylindrical portion 31 adjacent end portion 32 initially pulls away or unwraps from form 17; and the unwrapping gradually progresses around the periphery of the rotor until the static friction decreases to a minimum and motion begins. Hence the static friction is gradually dissipated as rotor movement begins, and there is no tendency to bind or jump as there would be if all the static friction were overcome instantaneously as in conventional capacitors.

Likewise, a similar unwrapping action occurs when shaft 21 is rotated in a counter-clockwise direction in Figure 3 whereby finger 29 pushes against end portion 33 and the other finger 28 pulls away from the other end portion 32. Thus, there is no tendency for rotor 23 to bind when rotated in either direction.

Electrical capacitance is provided by the invention between the common areas of stator plate 24 and rotor plate 17 which are separated by the dielectric material of form 17. As is generally known, the capacitance of parallel plate condensers is a function of the common area between the plates where the distance between the plates is maintained constant. Constant distance between plates is maintained in the invention by form 17 which acts as a spacer. Longitudinal movement of rotor 23 is provided by rotating threaded shaft 21; thus capacitance varies proportionately.

It is hence seen that this invention provides a variable capacitor which is capable of small and exact adjustments without the danger of binding or jumping and also provides a rotor which moves smoothly from an initial position to a required position without vibration. The invention further provides detent action to maintain a preset position and maintains constant spacing between the inner and outer plates.

While a specific embodiment of the invention has been described, various changes and modifications will be obvious to those skilled in the art which do not depart from the spirit and scope of the invention.

What I claim is:

1. A non-binding variable capacitor comprising; support means; a hollow cylindrical form of insulating material fixedly received at one end in said support means; a cylindrical plate of conducting material received on the outer side of said form at its other end; a shaft threadedly received through said support means axially of said form; a yoke fixed on said shaft and formed with a pair of fingers which extend parallel to said shaft; a rotor plate mounted on said shaft adjacent to said yoke; said rotor plate comprising, a terminal portion fixed to said shaft, an angular portion fixed at one end to said terminal portion, a cylindrical portion formed with a small longitudinal opening and resiliently received against the inner surface of said form, a pair of end portions fixed to the ends respectively of said cylindrical portion and extending inwardly, and one of said end portions connected to the other end of said angular portion; and said yoke fingers engaging the nonfacing opposite sides of said end portions, respectively.

2. A rotor arrangement for a variable capacitor which has plates coaxially arranged on opposite sides of a cylindrical form comprising; a shaft supported axially of said form; a yoke formed with an arcuate portion attached to said shaft, a first yoke finger fixed at one end to one side of said arcuate portion and extended parallel to said shaft, a second yoke finger fixed at one end to the other side of said arcuate portion and extended parallel to said first finger; said rotor formed of resilient material and comprising, a terminal portion, an angular portion formed with a bend, a cylindrical portion formed as a cylinder with a longitudinal opening, and a pair of end portions, said terminal portion fixed to said shaft, said angular portion fixed on one side to said terminal portion, each of said end portions fixed to said cylindrical portion on opposite sides of its gap and extended inwardly parallel to each other, the other end of said angular portion fixed to the inner edge of one of said end portions, said cylindrical portion biased outwardly and received slideably against the inner surface of said form, and said first and second fingers respectively slideably received by nonfacing opposite sides of said end portions.

3. A variable capacitor including; a support; a hollow cylindrical form fastened at one end to said support; a cylindrical plate of conducting material mounted on the outer side of said form; a shaft received through said support axially of said form; a yoke comprising, an arcuate portion fixed to said shaft, a first finger fastened at one end to said yoke and extended parallel to said shaft, and a second finger fastened at one end to said yoke and extended parallel to said first finger; a rotor plate of resilient conducting material comprising, a terminal portion fastened to said shaft, a cylindrical portion formed with a narrow longitudinal gap and spring biased against the inner surface of said form, a first end portion formed inwardly from said cylindrical portion at one side of the gap, a second end portion formed inwardly from said cylindrical portion at the other side of said gap, and an angular portion of said rotor plate formed between the outer end of said terminal portion and the inner end of said first end portion; and said first and second yoke fingers engaging respective nonfacing opposite sides of said end portions.

4. In a coaxial capacitor wherein a rotatable shaft can control capacitance comprising a yoke fixed on said shaft and having a pair of fingers which extend parallel to said shaft; a rotor plate having an angular portion fixed on one side to said shaft, an outwardly spring-biased cylindrical portion formed with a longitudinal opening, and a pair of rotor end portions extending inwardly from the edges of the longitudinal opening with one of said rotor end portions integrally formed with the outer side of the angular portion; and said yoke fingers engaging slideably the outer opposing sides of said end portions, whereby rotational engagement of the yoke fingers with the rotor plate end portions causes an unwrapping action that decreases the outwardly expandable force of the cylindrical portion for the period of the rotation in either direction.

References Cited in the file of this patent

UNITED STATES PATENTS

| 1,652,158 | Aull | Dec. 13, 1927 |
| 2,380,774 | Maitland | July 31, 1945 |
| 2,541,897 | Wadsworth | Feb. 12, 1951 |

FOREIGN PATENTS

| 628,499 | Germany | Apr. 6, 1936 |